United States Patent [19]

Hug et al.

[11] Patent Number: 4,473,624
[45] Date of Patent: Sep. 25, 1984

[54] ELECTROCHEMICAL STORAGE CELL

[75] Inventors: Kuno Hug; Reinhard Knödler, both of Heidelberg, Fed. Rep. of Germany

[73] Assignee: Brown, Boveri & Cie AG, Mannheim, Fed. Rep. of Germany

[21] Appl. No.: 371,124

[22] Filed: Apr. 23, 1982

[30] Foreign Application Priority Data

May 2, 1981 [DE] Fed. Rep. of Germany ....... 3117383

[51] Int. Cl.³ .......................... H01M 4/36; H01M 2/02
[52] U.S. Cl. .................................... 429/104; 429/193; 429/181
[58] Field of Search ............... 429/104, 171, 172, 181, 429/193

[56] References Cited

U.S. PATENT DOCUMENTS

| | | | |
|---|---|---|---|
| 2,544,115 | 3/1951 | Wagner | 429/171 X |
| 3,939,007 | 2/1976 | Sudworth et al. | 429/104 X |
| 4,052,533 | 10/1977 | Heinz | 429/171 X |
| 4,124,739 | 11/1978 | Sudworth | 429/104 |
| 4,129,690 | 12/1978 | Jones et al. | 429/104 |
| 4,234,668 | 11/1980 | Park et al. | 429/104 X |

Primary Examiner—G. Ozaki
Assistant Examiner—Stephen J. Kalafut
Attorney, Agent, or Firm—Herbert L. Lerner; Laurence A. Greenberg

[57] ABSTRACT

In an electrochemical storage cell of the alkali metal and chalcogen type, the closure has at least two closure elements which are plate-shaped at least in some areas. A first closure element is fastened to the housing and a second closure element is fastened to the rod-shaped current collector. All closure elements are additionally connected on the same side to the insulating ring of the solid electrolyte and are insulated from each other.

6 Claims, 2 Drawing Figures

ELECTROCHEMICAL STORAGE CELL

BACKGROUND OF THE INVENTION

1. Field of the Invention

The invention relates to an electrochemical storage cell of the alkali metal and chalcogen type with at least one anode space to receive the anolyte and a cathode space intended to receive the catholyte. The spaces are separated from each other by an alkali ion-conducting solid electrolyte and are confined, at least in some regions, by a metallic housing. The solid electrolyte is cup-shaped, and is connected at its open end to at least one ring-shaped insulating body in a force-locking manner. A rod-shaped current collector which protrudes to the outside goes through the lid of the storage cell and extends into its interior.

2. Summary of the Invention

Such rechargeable electrochemical storage cells with a solid electrolyte are highly suitable for constructing storage batteries with high energy and power density. The solid electrolytes which are used in the alkali/chalcogen storage cells and are made, for instance, of β-aluminum oxide, are distinguished by the feature that the partial conductivity of the mobile ion is very high and the partial conductivity of the electrons is smaller by many powers of ten. The use of such solid electrolytes for the construction of electrochemical storage cells, results in practically no self-discharge taking place because the electron conductivity is negligible and the reaction substances also cannot penetrate the solid electrolyte as neutral particles.

A specific example of such rechargeable electrochemical storage cells are those of the sodium and sulfur type, with the solid electrolyte made of β-aluminum oxide. One advantage of these electrochemical storage cells is that no secondary reactions occur during the charging of the storage cells. The reason for this is again that only one kind of ions can get through the solid electrolyte. The current yield of such a sodium/sulfur storage cell is therefore approximately 100%. In these electrochemical storage cells the ratio of the energy content to the total weight of such a storage cell as compared to a lead storage cell is very large since the reaction substances are light, and much energy is released in the electrochemical reaction. Therefore, electrochemical storage cells of the sodium and sulfur type have considerable advantages over conventional storage batteries such as lead storage batteries.

A disadvantage of these electrochemical storage cells is that they must be kept at high operating temperatures of about 300° to 500° C. for charging them, so that the chemical reactions required therefor can proceed in the desired manner. At these temperatures, considerable problems arise with the materials used. In particular, incompatibilities occur between the materials which are used for the manufacture of the storage cell and the reactants, especially the sodium and the sulfur. In the vicinity of the closure of this storage cell in which the openings of the two reactant spaces are adjacent to each other, corrosion phenomena appear in spite of the fact that these spaces are carefully sealed against each other.

An electrochemical storage cell is described in German Patent Application No. P 30 33 438.4, in which the thermo-compression method was used for making the cell closure. It is a disadvantage here that for making this closure, the annular space between the metallic housing and the solid electrolyte must be made wider than normal because the closure part outside the solid electrolyte itself is very wide.

SUMMARY OF THE INVENTION

It is, therefore, an object of the invention to provide an electrochemical storage cell, in which the design and construction of the cell closure, using the thermo-compression method, avoids a widening of the annular space between the metal housing and the solid electrolyte.

With the foregoing and other objects in view, there is provided in accordance with the invention an electrochemical storage cell based on alkali metal and chalcogen comprising at least one anode space for the alkali metal anolyte and a cathode space for the chalcogen catholyte, a cup-shaped alkali ion-conducting solid electrolyte separating the anode space from the cathode space, a metallic housing bounding at least some areas of one said space, an insulating ring connected to the cup-shaped solid electrolyte at its open end, a rod-shaped current collector extending into the interior of the cup-shaped solid electrolyte, a closure having at least two closure elements for closing off the space between the solid electrolyte and the metallic housing and for closing off the space between the current collector and the solid electrolyte, said closure elements each have a plate shaped member, said first closure element is fastened to the housing and its plate extends inward toward said current collector, said second closure element is fastened to the rod-shaped current collector and its plate extends outward away from said current collector, and first and second closure elements are connected on the same side of the insulating ring to the insulating ring, and the two closure elements are insulated electrically from each other.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
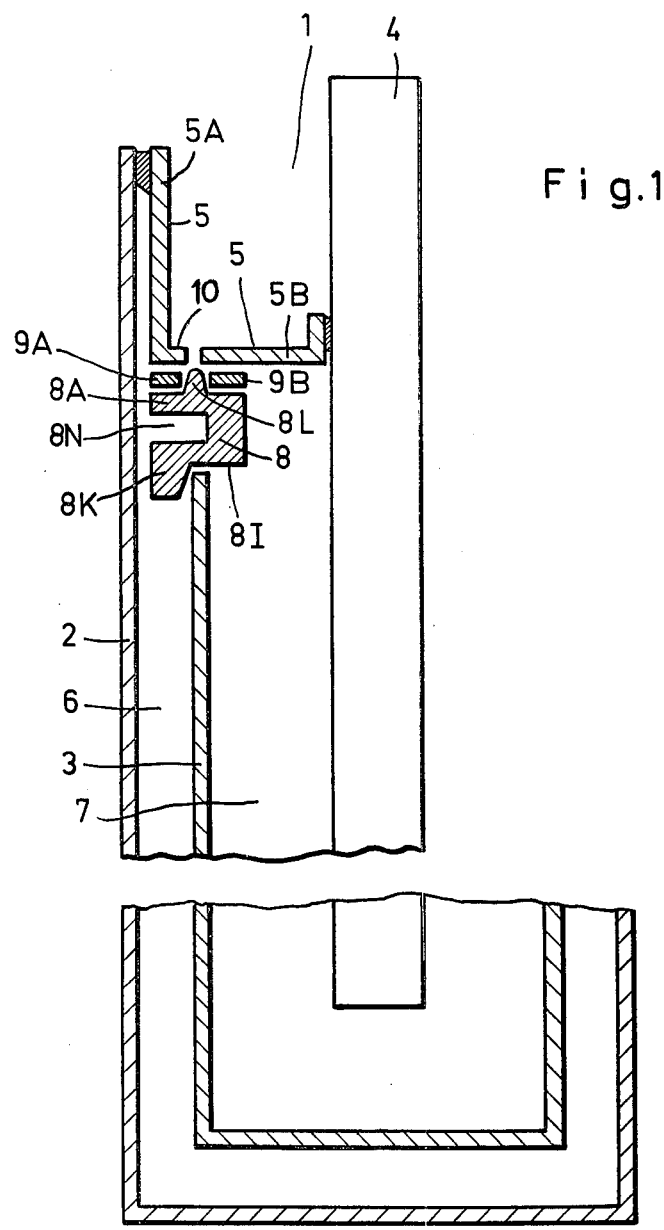
FIG. 1 diagrammatically illustrates a storage cell according to the invention in a vertical cross section to show particularly how the closure has a first closing element to close off the space between the metal housing and the solid electrolyte, and a second closure element to close off the space between the current collector and the solid electrolyte.

In a storage cell of the type mentioned at the outset, the closure has at least two closure elements whch are plate-shaped at least in some areas. A first closure element is fastened to the housing and a second closure element is fastened to the rod-shaped current collector. All closure elements are additionally connected on the same side to the insulating ring of the solid electrolyte and are insulated from each other.

According to the invention, each closure element is placed, with the interpositon of at least one aluminum washer, on the top side of the insulating ring made of α-aluminum oxide and is connected thereto in a force-locking manner through the use of the thermo-compression method.

In one embodiment of the invention, both closure elements are made of alloy steel. The first closure element is designed as a cylinder which is provided on one side with an inward-pointing flange. The width of this flange is chosen so that it covers at least the space between the solid electrolyte and the housing. The flange of the first closure element is placed via the aluminum washer on the insulating ring of the solid electrolyte and is connected thereto in a force-locking manner. The outer surface of the cylinder is connected in a force-locking manner to the inside surface of the metallic housing. The second closure element is designed as a washer. The diameter of the washer is chosen sufficiently large that at least the interior of the solid electrolyte is covered by the second closure element. The outer rim of the washer is placed on a second aluminum washer lying on the insulating ring and is connected via the former to the insulating ring in a force-locking manner.

Through the arrangement of aluminum washers between each of the two closure elements and the insulating ring, a force-locking connection of the elements is effected, using the known thermo-compression method. Thereby, a closure is provided which, especially at the temperatures prevailing in the storage cell and with the reaction substances formed, is permanently stable. The two closure elements connected to the insulating ring of the solid electrolyte via an aluminum washer each, are preferably made of alloy steel. Since, as already mentioned above, the first closure element is connected to the housing and the second closure element to the rod-shaped current collector, the two closure elements must be insulated from each other. This is accomplished by a lip which is formed-on at the top side of the insulating ring circling around on the insulating ring. The lip is approximately centered on the insulating ring. The outer boundary edges of the closure elements are brought to this lip from both sides. The lip is, likewise, made of α-aluminum oxide so that no electrically conducting connection is possible between the two closure elements.

In one embodiment of the invention, the insulating ring is provided with a recess on its outward-pointing side. In this recess, the bonding tool can be supported which is necessary for carrying out the thermo-compression process.

In another embodiment of the invention, both closure elements are made of aluminum. Here, the second closure element is placed directly on the insulating ring of the solid electrolyte and connected thereto in a force-locking manner by means of the thermo-compression method. The first closure element is placed on the second closure element with the interposition of an α-aluminum oxide washer and, likewise, joined to the latter in a force-locking manner through the use of the thermo-compression method.

Advantageously, a storage cell with such a closure can be made with a smaller diameter, and can be closed with the aid of the thermo-compression method, than is possible in the conventional storage cells. This is very important especially in inverted storage cells, where the sulfur is arranged inside the solid electrolyte and the sodium inside the annular space, because here, the diameter of the metal housing can be made considerably smaller if the storage cell according to the invention is used, because of the smaller cell capacity.

Due to the smaller diameter of the storage cell it is also possible to accommodate a larger number of storage cells in one battery, or the battery can be made smaller for the same number of storage cells. A further advantage is obtained with the storage cell according to the invention for the connection of the insulating ring to the solid electrolyte. Since the insulating ring is made of α-aluminum oxide, it is preferably fastened to the solid electrolyte by a glass solder. Since in the embodiments of the storage cell according to the invention described here, all the closure elements are connected to the top side of the insulating ring, the underside of the insulating ring no longer needs to be cleaned, after the fusing of the glass solder, as carefully as heretofore, since no other parts of the storage cell are fastened there.

A further advantage of the storage cell according to the invention is obtained for mass production. In the design of the closure, the metal parts need to be fed-in only from one side. The same applies to exerting the pressure required for joining the parts by the thermo-compression method.

In the following, the invention will be explained with the aid of the drawings.

The electrochemical storage cell 1 shown in FIG. 1 is formed essentially of a cup-shaped housing 2, a solid electrolyte 3, a current collector 4 and a closure 5. The cup-shaped housing 2 is made of metal and designed as a tube closed at one end. The cup-shaped solid electrolyte 3 is arranged inside the housing. The solid electrolyte 3 shown as an embodiment in FIG. 1 is made of β-aluminum oxide. The dimensions of the solid electrolyte 3 are chosen so that between its outer surfaces and the inside surfaces of the metallic housing 2 a coherent space 6 is formed which serves as one of the reactant spaces. The interior 7 of the solid electrolyte 3 forms the second reactant space. The height of the solid electrolyte 3 is chosen slightly smaller than the height of the housing 2. At its open end, the solid electrolyte is provided with an insulating ring 8. The latter is made of α-aluminum oxide and is fastened to the solid electrolyte 3 by means of a glass solder (not shown). The insulating ring 8 is placed on the solid electrolyte 3 in such a manner that it forms an outward and an inward-pointing flange 8A and 8I, respectively. The insulating ring 8 is additionally provided with a downward edge 8K. With the aid of the latter, it is possible to center the insulating ring 8 accurately on the solid electrolyte 3. Only when the edge 8K contacts the outer surface of the solid electrolyte 3 exactly, is the desired position of the insulating ring 8 on the solid electrolyte 3 reached. At its outward-pointing lateral surface, the insulating ring 8 is provided with a recess 8N. The latter is required for developing the cell closure by the thermo-compression method. In the recess 8N, the bonding tool can be supported which is necessary for carrying out the thermo-compression method. On its upward-pointing side, the insulating ring 8 is provided, centered, with a circular rib 8L. On both sides of the lip, aluminum rings 9A and 9B, respectively, are placed on the insulating ring 8.

The closure 5 of the storage cell is formed by two closure elements 5A and 5B. The first closure element 5A has in part the form of a cylinder which has an inward-pointing flange 10. The latter forms the plate-shaped part of the closure element 5A. The outside diameter of the cylinder is fitted to the inside diameter of the housing 2. The width of the flange 10 is chosen so that at least the space 6 formed between the housing 2 and the solid electrolyte 3 is covered. Preferably, the flange 10 is chosen of a width to extend up to the lip 8L of the insulating ring 8. The height of the closure element 5A and in particular, of the cylinder depends on the distance between the upper end of the housing 2 and the surface of the insulating ring 8. The outer surface of the cylinder 5A is connected in a force-locking manner to the inside surfaces of the housing 2, e.g. the outer cylinder surface 5A is welded to the inside surface of the housing 2. The flange 10 is placed on the aluminum ring 9A and connected in a force-locked manner to the insulating ring 8 by the thermo-compression method. As mentioned, the closure 5 of the storage cell has a second closure element 5B. The latter is formed by a washer whose diameter is large enough to completely cover the interior 7 of the solid electrolyte 3.

Preferably, the diameter of the washer 5B has its outer edge extend up to the lip 8L of the insulating ring 8. The outward-pointing edge of the washer 5B is placed on the aluminum ring 9B and is joined in a force-locked manner to the insulating ring 8 by using the known thermo-compression method.

The current collector 4 goes through the center of the washer 5B and continues down into the solid electrolyte 3, and also protrudes upward to the outside beyond the closure 5. The washer 5B is connected in a force-locked manner to the current collector 4. To develop an optimum cell seal, the rim of the washer 5B which adjoins the current collector 4, is drawn or bent slightly up. When the housing 2 serves as the current collector, the two closure elements 5A and 5B must be insulated from each other electrically. This is accomplished by the lip 8L which is formed-on at the insulating ring 8. It consists of α-aluminum oxide and separates the two closure elements 5A and 5B which are brought toward it from both sides. In the embodiment example shown here, the housing 2 and the closure 5 are made of alloy steel. The current collector 4 is a rod made of metal. The interior 7 of the solid electrolyte 3 is the cathode space filled with sulfur. The space 6 between the housing 6 and the solid electrolyte 3 is filled with sodium and serves as the anode space. The metal housing 2 acts as the anodic current collector. Of course, the function of the two reactant spaces 6 and 7 may be interchanged.

Figure 2:
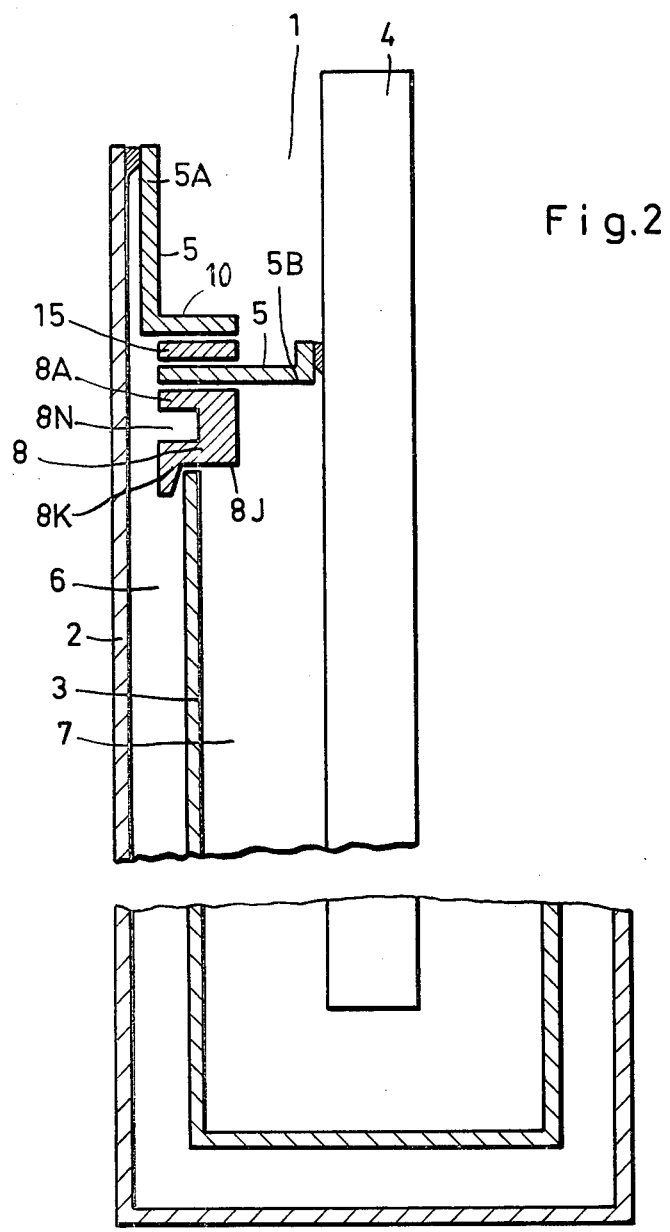
FIG. 2 illustrates a variant of FIG. 1.

FIG. 2 shows a variant of the storage cell 1 in FIG. 1. The storage cell 1 has a housing 2 of metal, a solid electrolyte 3, a current collector 4 and a closure 5. The solid electrolyte 3 also has an insulating ring 8 designed substantially like the insulating ring 8 according to FIG. 1, except that an insulating lip 8L was dispensed with. The closure 5 of the storage cell 1 is formed, here also, by two closure elements 5A and 5B. The closure element 5A is designed as a cylinder which has an inward-pointing flange 10. The closure element 5B has the form of a washer. The diameter of the washer is preferably chosen so that its outer edge lies in one plane with the other edge of the insulating ring 5. Both closure elements 5A and 5B are made of aluminum. The closure element 5B is disposed directly on the surface of the insulating ring 8 and joined to it in a force-locking manner by the thermo-compression method. The current collector 4, which extends into the interior of the solid electrolyte 3 and protrudes upward several mm beyond the closure 5, goes through the center of the washer 5B. To form a reliable seal, the rim of the washer 5B adjacent to the current collector 4 is drawn or bent upward and welded to the current collector 4. A washer 15 of α-aluminum oxide is placed on the upper side of the washer 5B in the vicinity of the insulating ring 8. The width of the washer 15 corresponds approximately to the width of the insulating ring 8. The flange 10 of the first closure element 5A is placed on this washer 15. The width of the flange 10 is chosen so that its outer contour terminates in one plane with the inner boundary of the insulating ring 8. The first closure element 5A is likewise connected to the insulating ring 8 in a force-locking manner by using the thermo-compression method. As already mentioned, the connecting element 5A is cylindrical in some areas. The height of the cylinder is made so that the connecting element 5A terminates in one plane with the housing 2. The outer surface of the cylinder is connected in a force-locking manner to the inside surface of the housing 2. In the embodiment example described here, the housing 2 can also be made of aluminum. The interior 7 of the solid electrolyte 3 then serves as the cathode space. The space 6 between the housing 2 and the solid electrolyte 3 forms the anode space. The function of the two reactant spaces 6 and 7 can also be interchanged in this storage cell.

We claim:

1. Electrochemical storage cell based on alkali metal and chalcogen comprising at least one anode space for the alkali metal anolyte and a cathode space for the chalcogen catholyte, a cup-shaped alkali ion-conducting solid electrolyte separating the anode space from the cathode space, a metallic housing bounding at least some areas of one said space separated by the solid electrolyte, an insulating ring connected to the electrolyte at its open end, a rod-shaped current collector extending into the interior of the cup-shaped solid electrolyte, a closure having at least two closure elements with a first closure element of said two closure elements for closing off the space between the solid electrolyte and the metallic housing and a second closure element of said two closure elements for closing off the space between the current collector and the solid electrolyte, said first and second closure elements being insulated electrically from each other, said second closure element in the form of a washer being connected with its inner rim to the current collector, said second closure element also having its outer rim directly connected to the top side of the insulating ring, said first closure element in the form of a cylinder having an inward-pointing flange on one side of the cylinder and with the outside surface of the cylinder being connected to the inside surface of the housing, said flange of the cylinder being connected via an insulating washer made of alpha aluminum oxide to the top side of the second closure element.

2. Storage elements according to claim 1, wherein the closure elements are made of aluminum.

3. Storage elements according to claim 1, wherein the closure elements are made of alloy steel.

4. Storage cell according to claim 1, wherein the first closure element at least covers the space between the solid electrolyte and the housing.

5. Storage cell according to claim 1, wherein the second closure element covers at least the interior of the solid electrolyte.

6. Storage cell according to claim 1, wherein the insulating ring is provided on the outward pointing side with a recess for receiving a bonding tool.

* * * * *